July 12, 1966  H. EBERS  3,260,297
APPARATUS FOR REMOVING THE SQUEEZE-OUT ON RUBBER TIRES
Filed Dec. 11, 1964  4 Sheets-Sheet 1

Inventor
Heinz Ebers
By
[signature]

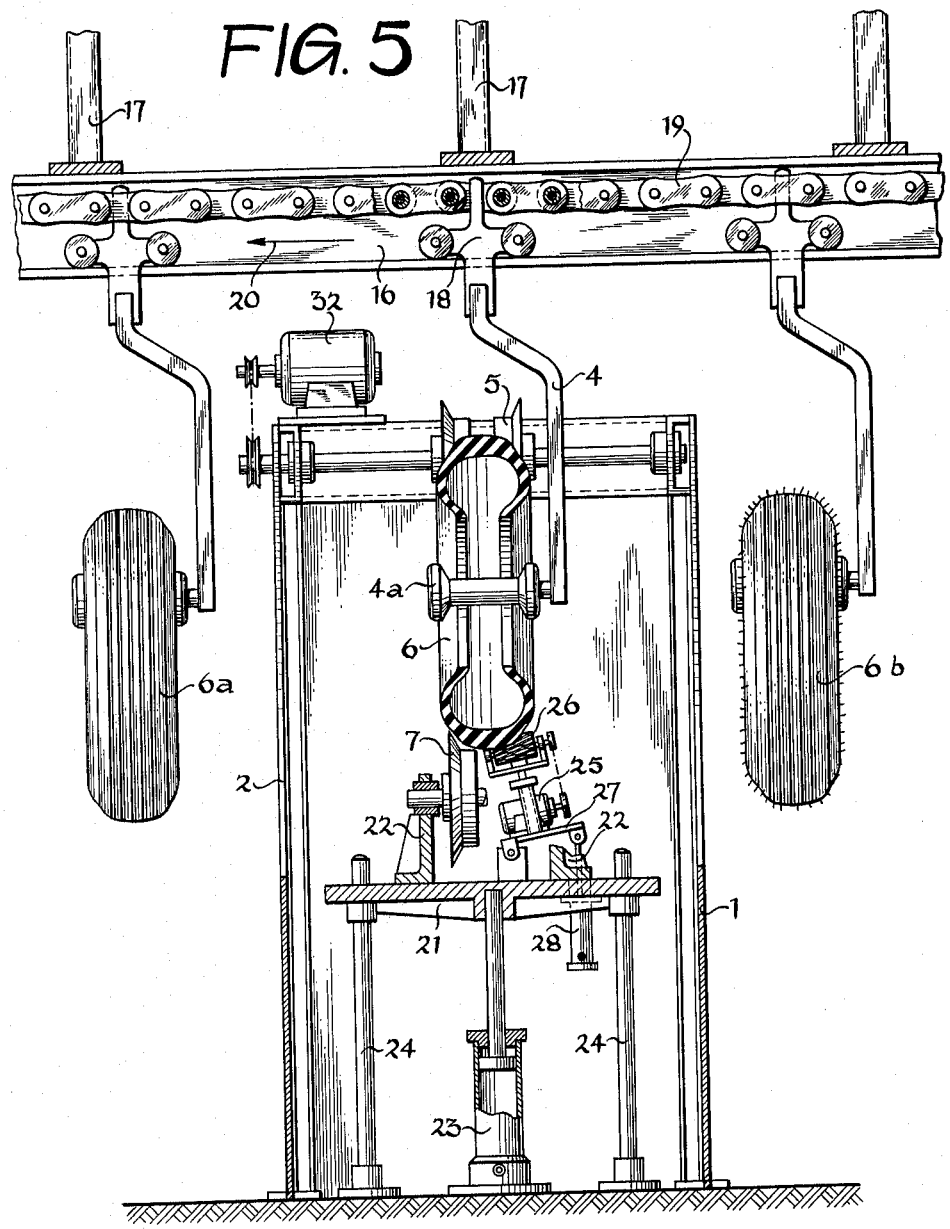

United States Patent Office 3,260,297
Patented July 12, 1966

3,260,297
APPARATUS FOR REMOVING THE SQUEEZE-OUT ON RUBBER TIRES
Heinz Ebers, Seelze, Germany, assignor to Continental Gummi-Werke Aktiengesellschaft, Hannover, Germany
Filed Dec. 11, 1964, Ser. No. 417,748
Claims priority, application Germany, Dec. 13, 1963, C 31,674
9 Claims. (Cl. 157—13)

The present invention relates to an apparatus for removing the squeeze-out of rubber tires as it occurs along the dividing plane of molds and at the venting holes. Such squeeze-out as it occurs along the dividing line of molds is in the form of a narrow band extending around the tread surface of the tire and substantially perpendicular thereto, whereas the squeeze-out through the venting holes has the shape of thin pins protruding from the tread surface and also from the side walls of the tire.

Heretofore known apparatuses for cutting off the squeeze-out are provided with guiding and driving rollers which engage the tread surface of the tire received by the apparatus and rotate said tire, while cutting elements such as knives or blades extending in a direction opposite to the direction of rotation of the tire cut off said squeeze-out.

It is also known to arrange conveyor means in front of the apparatus from which the apparatus automatically picks up the tires whereupon the tires are machined by the apparatus and conveyed to further conveying means. The drawback of such an arrangement consists in that special means are required in order to pick up the respective tire from the conveying means feeding the tire to the machine, and for conveying the tire from the apparatus to other conveying means conveying the tire, for instance, to checking devices or to storage places.

It is therefore an object of the present invention to provide an apparatus of the above-mentioned general type, which will overcome the above-mentioned drawbacks.

It is another object of this invention to provide an apparatus for removing the squeeze-out as it occurs on rubber tires during the molding thereof, which will make it unnecessary to remove the tire to be machined, from the conveying means feeding the tire to the apparatus and thus will also make it unnecessary to return the tire from the machining apparatus to other conveying means feeding the machined tire to checking devices or storage places.

These and other objects and advantages of the invention will appear more clearly from the following specification in connection with the accompanying drawings, in which:

FIGURE 1 diagrammatically illustrates a side view of an apparatus according to the invention with a tire to be machined therein;

FIGURE 5 is a section taken along the line V—V of FIGURE 3.

Figure 1:
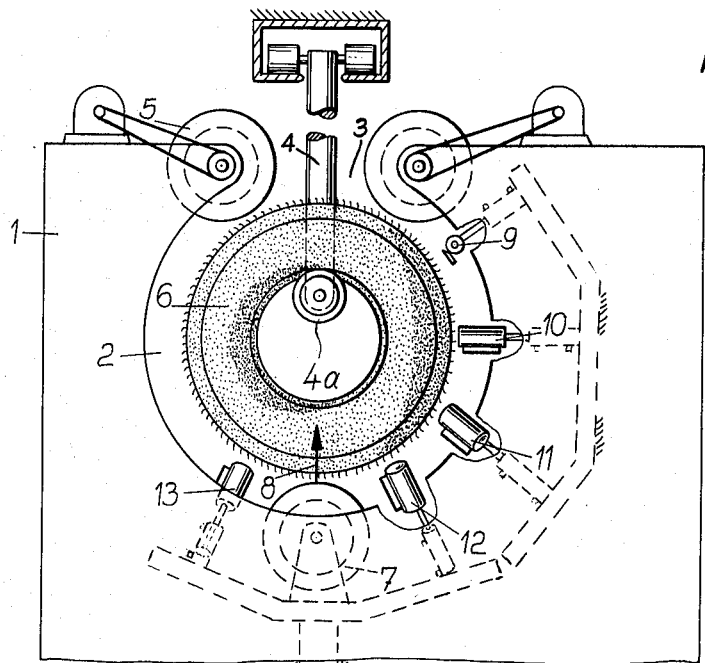

The apparatus according to the present invention in which the tire to be machined is guided and turned by rotating rollers past cutting knives or blades for cutting off the squeeze-out on the tire, is characterized primarily in that in a direction transverse to the machining position of the tire in the apparatus, there is provided a passage for the cross-section of the tire and supporting means for the tire while at both side of said passage there is provided a fixed guiding or driving roller each. The apparatus furthermore comprises at least one guiding or driving roller movable into said passage, while a portion of the machining knives or blade is likewise movable into said passage.

Referring now to the drawing in detail, the apparatus shown therein comprises a frame 1 provided at its upper portion with a circular passage 2 having at its upper end an opening 3 through which extends a supporting member 4 of a conveying device as, for instance, a rail on which supporting member 4 is suspended by means of rollers, as is standard in the conveying art. Member 4 has an arm 4a for supporting the tire to be trimmed.

At both sides of passage 3 there are provided driving and guiding rollers 5 for a tire 6 to be machined. These rollers 5 are so spaced from each other that when the tire engages said rollers 5, it will be safely guided. Opposite the opening 3 there is provided a guiding roller 7 adapted by corresponding means as, for instance a hydraulic cylinder-piston system, to be moved into passage 2 in the direction of the arrow 8. It is, of course, to be understood that the movement of the driving and guiding rollers may be effected in any convenient manner, preferably, however, by hydraulic means so that a fast, controllable and precise movement of the individual elements will be possible.

Advantageously, the guiding rollers adjacent the opening 3 for the passage of supporting member 4 are designed as driving rollers. Instead of designing both rollers 5 on each side of opening 3 as driving rollers, it will suffice to employ one of these rollers only as driving roller inasmuch as the other roller will automatically be rotated when the tire 6 to be machined engages both rollers 5. Analogously, the rotation of the tire and thus the machining thereof is automatically stopped when the displaceable rollers are returned to their starting position.

As will be evident from the above, in view of the arrangement just described, simultaneously with the completion of the machining of the tire, the latter is lowered back onto conveying arm 4a, and by suitable release mechanisms, the tire is immediately conveyed from the apparatus onto the conveying means conveying the tire to the next processing station or storage place, while the next oncoming tire is introduced into the apparatus.

As will also be seen from the drawing, adjacent the circumference of passage 2 there is provided a cutter or knife 9 which is in its retracted position. Knife 9 is intended for cutting off the squeeze-out as it occurs on the central tread surface portion. Also arranged at the periphery of passage 2 are two trimming knives 10 for trimming off the the squeeze-out on the side walls of the tire. There are also provided on each side of the apparatus trimming knives 11 for cutting off the squeeze-out at the round shoulders of the tire. Finally, there are provided trimming knives 12, 13 for cutting off the squeeze-out on the lateral wall surfaces of the tire. A portion of the knives, especially those for cutting off the squeeze-out on the tread surface of the tire, may be located on the support for the guiding rollers adapted to be moved into passage 2. In this way, the knives are simultaneously with the roller 7 moved toward the tire to be machined, and the knives require only a slight movement of their own furnished, for instance, by the force of a spring, in order to properly brace the knives against the tread surface of the tire.

Figure 2:
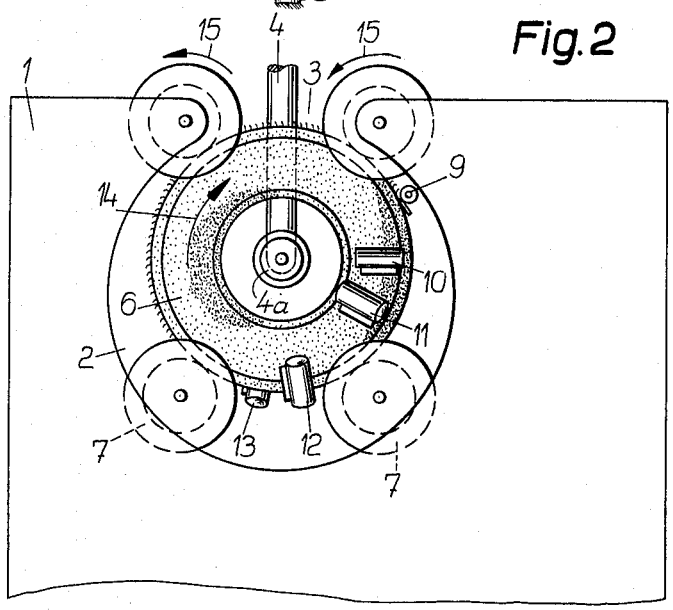
FIGURE 2 illustrates a side view of a modified apparatus according to the present invention showing the apparatus in its machining stage, the arrangement of FIGURE 2 differing from that of FIGURE 1 by the number of guiding rollers.

The apparatus according to FIG. 2 differs from that according to FIG. 1 primarily in that instead of one movable guiding roller 7, there are provided two guiding rollers 7 which are actuated together by one or a plurality of hydraulic means and are adapted to be moved thereby into passage 2. FIG. 2 shows the apparatus during its machining operation. As will be evident from FIG. 2, when the apparatus occupies its machining position, guiding rollers 7 have moved upwardly into passage 2 so that tire 6 is pressed against the driven guiding rollers 5 and at the same time is being rotated in the direction indicated by the arrow 14. The driven guiding rollers 5 are rotated continuously in the direction indicated by the arrows 15. Furthermore, trimming knives 9, 12 and 13 have been moved against the tread surface of tire 6 so that the respective squeeze-out on the tire tread surface will be cut off, while the trimming knives 10, 11 have been moved into passage 2 and cut the squeeze-out on the flanks of tire 6.

It will be appreciated that due to the upward movement of guiding rollers 7, tire 6 will be lifted off from supporting arm or roller 4a at the bottom of support 4 so that tire 6 will be free from support 4 and will be freely rotatable. After the ssueeze-out on tire 6 has been cut off, guiding rollers 7 are retracted to their starting position, and simultaneously also the trimming knives are returned to their ineffective position. When the tire is disengaged from rollers 5, the rotative movement of the tire is interrupted and at the same time tire 6 is returned to supporting roller 4a of support 4 into a position corresponding to that of FIG. 1 for conveying the finish-machined tire to another processing station or to a storage place.

As will be evident from the above, the conveying means for the tire moves the tire supported on an angular arm with a roller into the apparatus according to the invention while the movement of said angular arm is interrupted merely for the duration of the machining of the tire in the apparatus, so that after the very short time required for said machining, the conveyor arm will be able to continue its movement. As soon as the tire has arrived in the trimming apparatus, the guiding roller or rollers 7 is or are moved inwardly whereby the tire is placed into contact with the guiding or driving rollers 5. At the same time, the tire is disengaged from the supporting roller 4a so that it is freely rotatable between rollers 5 and 7. The transport of the tire by conveying means including a suspended support 4 with an arm 4a, is particularly advantageous for the purpose involved inasmuch as the tire, after it has been machined, can by its own weight easily be returned onto arm 4a. Simultaneously with the engagement of the tire by the guiding or driving rollers, the cutting tools are moved into passage 2, especially those which laterally machine the tire. The cutting knives which cut off the squeeze-out of the tread surface of the tire are by suitable means pressed only against the tread surface of the tire.

Figure 3:
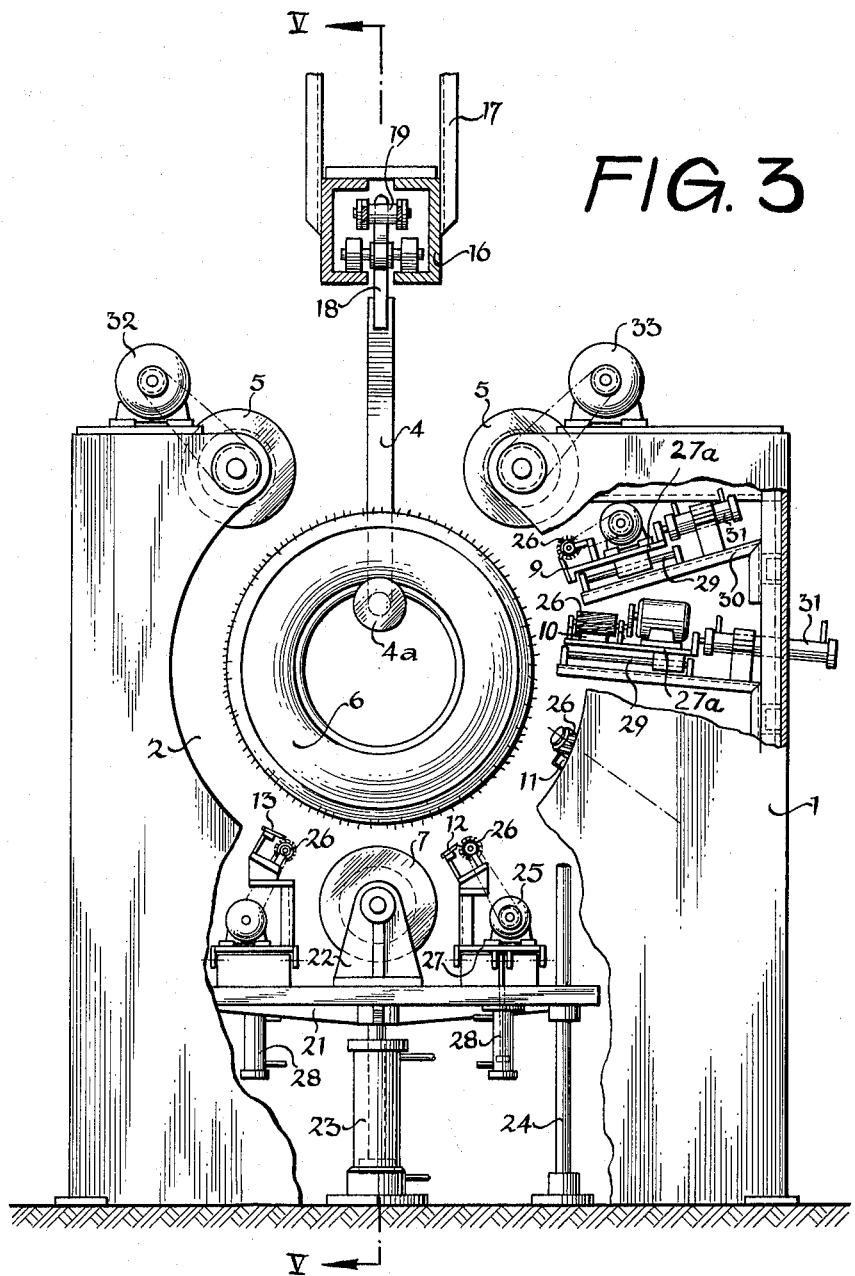
FIGURE 3 illustrates in greater detail than FIGURE 1 the apparatus according to the present invention.
Figure 4:
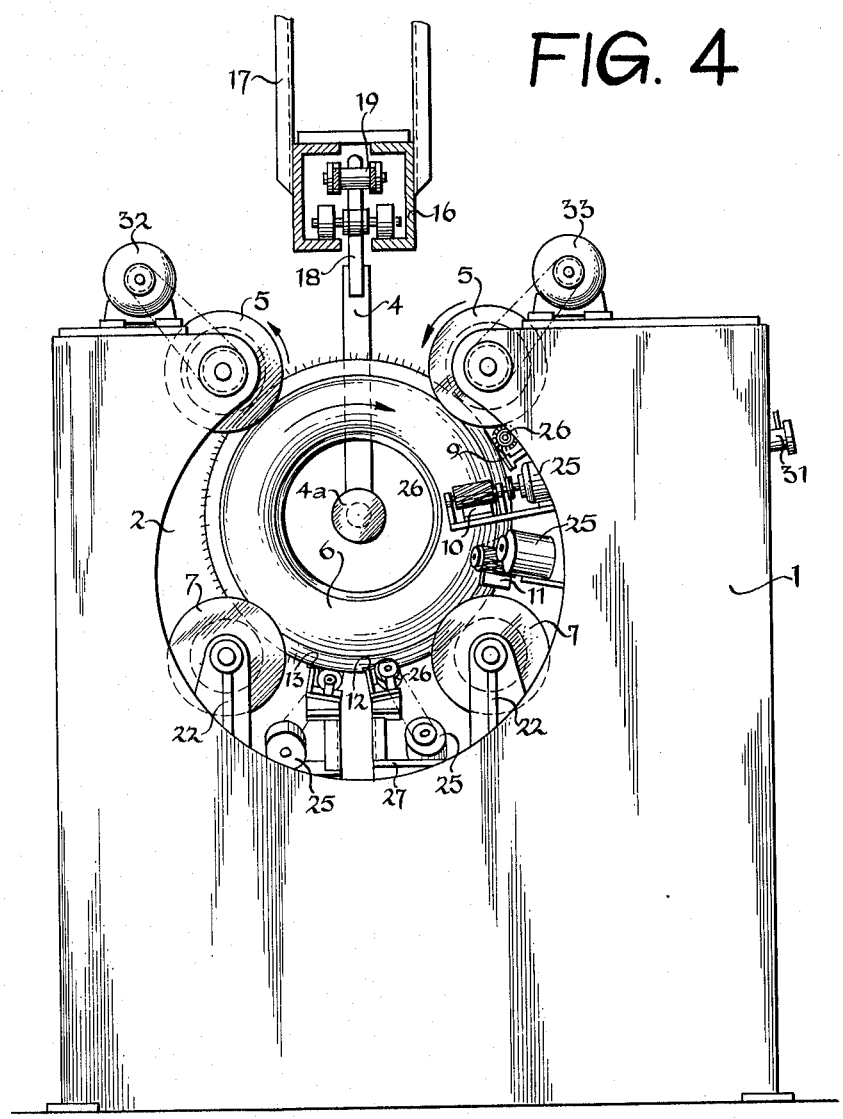
FIGURE 4 illustrates in greater detail than FIGURE 2 the modified apparatus according to the present invention in its machining stage.

Whereas FIGS. 1 and 2 diagrammatically illustrate the design of the machine, FIGS. 3 to 5 show further details. Similar to FIG. 1, FIG. 3 shows the machine in its starting position. Tire 6 is suspended from support 4 in passage 2 in such a way that the tire is located between rollers 5 and 7. Support 4 is suspended from a conveyor line or track 16 formed by two U-irons and connected to the ceiling of the machine hall by means of rails 17. The upper end of support 4 has arranged thereon a carriage 18 which is advanced in a stepwise manner (in track 16) by means of a chain 19 in the direction of arrow 20 (FIG. 5). As shown in FIG. 5, tire 6 is just being treated in the machine while in a preceding working operation the squeeze-out of tire 6a had been removed. On the other hand, tire 6b will advance into the machine with the next advancing step of chain 19 and will be treated in said machine. Tire 6 has been lifted by roller 7 (in FIG. 5 only one-half of the roller being shown) and rotates as it is driven by rollers 5 and freed from arm 4a. Roller 7 is freely rotatably journalled on table 21 in bearing blocks 22. Table 21 with all the devices arranged thereon is lifted and lowered by means of a hydraulic cylinder piston system 23 and guided by rods 24. On both sides of roller 7 there are provided trimming knives 12, 13 which are fixedly connected to a base plate 27 together with their respective drive motor 25 and cutting roller 26. Base plate 27 is pivotally journalled on table 21 and may be tilted by means of a hydraulic cylinder piston system 28. In this way, trimming knife 12 or 13 may be pressed against the running surface of tire 6.

Following treatment of tire 6, table 21 is lowered again into the position shown in FIG. 3 in which also the base plates 27 have been tilted into their horizontal position by means of the cylinder piston system 28. Roller 7 and trimming knives 12, 13 withdraw from tire 6 as soon as the latter is suspended again from arm 4a. Carriage 18 of track 16 may then be advanced by another step.

Cutting knives 9, 10 and 11 each are fixedly connected to a base plate 27a which has arranged thereon one cutting knife 26 and one motor 25 each. The base plates 27a of these three trimming knives 9, 10 and 11 are displaceable approximately radially with regard to tire 6 along rods 29 connected to supports 30. In this way, trimming knives 9, 10 and 11 may be brought into working position by means of hydraulic cylinder piston systems 31. The actuation of all cylinder piston systems 23, 28 and 31 is effected simultaneously and, more specifically, either toward the tire or away therefrom.

At least one of the top rollers 5 is continuously rotated by a motor 32. This roller 5 then simultaneously serves as driving and guiding roller. Although this one roller 5 rotates continuously, the tire itself is rotated only when it has been lifted off support 4 by means of roller 7 and been pressed against the rotating roller 5. It is to be understood that also the other roller 5, i.e. that roller 5 which is located to the right with regard to passage 2 (with regard to FIG. 5) is a driven roller, viz. driven by a motor 33. The speed of the two rollers 5 should be the same.

FIG. 4 shows a machine corresponding to that of FIG. 2, in its working position. In this arrangement two guiding rollers 7 have been provided which afford a safer guiding of tire 6. The trimming knives 12, 13 are connected to table 21 between guiding rollers 7, and the bearing blocks 22 are arranged at the marginal portions of table 21. Table 21 is lifted and lowered by means of a cylinder piston system 23 and guided by means of rods 24 in the same manner as described in connection with FIG. 3. Trimming knives 9, 10 and 11 with their cutting rollers 26 and driving motors 25 on base plates 27 are moved toward tire 6 and now remove the squeeze-out therefrom. The movement of these elements is effected by means of the cylinder piston system 31, as shown and described in connection with FIG. 3.

It is, of course, to be understood that the present invention is, by no means, limited to the particular arrangements shown in the drawings, but also comprises any modifications within the scope of the appended claims. Thus, while with regard to a safe guiding of the tire and a minimum of structural elements it has been found advantageous, at both sides of opening 3, to provide one driven guiding roller 5 each, while similarly arranging two movable rollers 7 designed exclusively as guiding rollers at the opposite location of passage 2, it is to be desired that any desired number of driving or guiding rollers may be provided.

It should also be noted that while according to the preferred form of the present invention, the tire to be trimmed is suspended on arm 4a which extends upwardly through opening 3 and is in its turn suspended on a horizontal conveying rail, the present invention also applies to an arrangement where the opening 3, instead of being in the upper portion of the frame, would be in the lower portion of the frame, in which instance supporting rod 4 would extend downwardly.

What I claim is:

1. An apparatus for removing the squeeze-out on vulcanized tires, which includes: frame means with a substantially horizontal passage therethrough having a vertical cross-section transverse to its axial direction greater than the diameter of the tire from which the squeeze-out is to be machined to thereby permit passing a tire to be machined through said passage in axial direction thereof with one broad side of the tire facing in the axial direction of said passage, said frame means also having an opening therethrough communicating with said passage and extending in axial direction thereof to thereby permit supporting means for a tire to be machined to be introduced in the axial direction of said passage through said opening into said passage to convey a tire to be machined into said passage, first roller means rotatably but normally stationarily journalled in said frame means on opposite sides of said opening and extending into said passage, second roller means rotatably and displaceably supported by said frame means at that side of said passage which is opposite to that side thereof where said opening is located, said second roller means being movable in a direction transverse to said axial direction of said passage and selectively toward and away from said first roller means to thereby selectively lift a tire from its supporting means and rotatably hold the tire between said first and second roller means and to release the tire therefrom to said supporting means, drive means for driving at least one of said roller means in rotation thereby to cause a tire held between said first and second roller means to rotate, and cutting means arranged at the peripheral portion of said passage and movable selectively in a direction toward and away from the axis of said passage for cutting off the squeeze-out of a tire rotatably held by said first and second roller means, and rotated by said drive means.

2. An apparatus according to claim 1, in which said opening is arranged in the upper portion of said frame means above said passage.

3. An apparatus for removing the squeeze-out on vulcanized tires, which includes: frame means with a substantially horizontal passage therethrough having a vertical cross-section transverse to its axial direction greater than the diameter of the tire from which the squeeze-out is to be machined to thereby permit passing a tire to be machined through said passage in axial direction thereof with one broad side of the tire facing in the axial direction of said passage, said frame means also having an opening therethrough communicating with said passage and extending in axial direction thereof to thereby permit support means for a tire to be machined to be introduced in the axial direction of said passage through said opening into said passage to convey a tire to be machined into said passage, first roller means rotatably but normally stationarily journalled in said frame means on opposite sides of said opening and extending into said passage, second roller means rotatably and displaceably supported by said frame means at that side of said passage which is opposite to the side where said opening is located, said second roller means being movable in a direction transverse to said axial direction of said passage and selectively toward and away from said first roller means to thereby selectively lift a tire from its supporting means and hold the tire between said first and second roller means and to release the tire therefrom to said supporting means, drive means for driving at least one of said roller means in rotation thereby to cause a tire held between said first and second roller means to rotate, and cutter means arranged at the peripheral portion of said passage and movable selectively in a direction toward and away from the axis of said passage for cutting off the squeeze-out on a tire rotatably held by said first and second roller means and rotated by said drive means.

4. An apparatus according to claim 1, which includes movable supporting means in said frame supporting said second roller means, said movable supporting means also supporting at least some of said cutting means, said cutting means also being movable relative to said supporting means.

5. An arrangement according to claim 1, which includes hydraulically operable means operatively connected between said frame and said second roller means for moving said second roller means in a direction toward and away from said first roller means.

6. An arrangement according to claim 1, which includes hydraulically operable means in said frame operatively connected to at least some of said cutting means and operable selectively for moving at least some of said cutting means in a direction toward and away from the axis of said passage.

7. An apparatus according to claim 4, which includes spring means for moving said cutting means relative to said supporting means.

8. An apparatus according to claim 3 in which said means for driving at least one of said roller means comprises motor means connected to said first roller means.

9. An apparatus according to claim 3 in which said second roller means comprises two roller means which are substantially diametrically opposite respective one of said first roller means when a tire is supported between said first and second roller means.

References Cited by the Examiner

UNITED STATES PATENTS

| | | | |
|---|---|---|---|
| 2,603,290 | 7/1952 | Lindemann | 157—13 |
| 2,606,612 | 8/1952 | Dinnan | 157—13 |
| 2,863,506 | 12/1958 | Skinner | 157—13 |
| 2,996,110 | 8/1961 | Bosonworth et al. | 157—13 |

GRANVILLE Y. CUSTER, JR., *Primary Examiner.*